US006954173B2

(12) United States Patent
Mrstik

(10) Patent No.: US 6,954,173 B2
(45) Date of Patent: Oct. 11, 2005

(54) TECHNIQUES FOR MEASUREMENT OF DEFORMATION OF ELECTRONICALLY SCANNED ANTENNA ARRAY STRUCTURES

(75) Inventor: A. Vincent Mrstik, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 33 days.

(21) Appl. No.: 10/612,693

(22) Filed: Jul. 2, 2003

(65) Prior Publication Data

US 2005/0001760 A1 Jan. 6, 2005

(51) Int. Cl.[7] ............................ G01S 7/40; H01Q 3/26
(52) U.S. Cl. ...................... 342/173; 342/165; 342/174; 342/175; 342/195; 342/196; 342/368; 342/371; 342/377
(58) Field of Search ............................... 343/912, 913, 343/25 R–26 D, 165–175, 195, 196, 352, 343/354, 368–384

(56) References Cited

U.S. PATENT DOCUMENTS 5,003,314 A * 3/1991 Berkowitz et al. .......... 342/372
6,215,458 B1 * 4/2001 Aguttes et al. ............ 343/915
6,333,712 B1 * 12/2001 Haugse et al. ............ 342/375
6,703,970 B2 * 3/2004 Gayrard et al. ............ 342/354

FOREIGN PATENT DOCUMENTS

JP 2002124817 A * 4/2002 ........... H01Q 3/26

OTHER PUBLICATIONS

1999 IEEE, pp. 172-176, "In Orbit Active Array Calibration for NASA's LightSAR," Daniel S. Purdy, Anthony Jacome-Hood, Lockheed Martin Corporation.

* cited by examiner

*Primary Examiner*—Bernarr E. Gregory
(74) *Attorney, Agent, or Firm*—Leonard A. Alkov; Karl A. Vick

(57) ABSTRACT

Techniques for simultaneous measurement of multiple array elements of an array antenna. The array is illuminated with a coherent signal source, and each array element phase shifter is cycled through a range of phase shifter settings at a unique rate. The phase shifted signals from each array element are combined to provide a composite signal. The composite signal is processed to extract the phase of the coherent source signal as received at each element. The phase information is used to determine the location of the elements relative to each other.

22 Claims, 4 Drawing Sheets

TECHNIQUES FOR MEASUREMENT OF DEFORMATION OF ELECTRONICALLY SCANNED ANTENNA ARRAY STRUCTURES

BACKGROUND OF THE INVENTION

An exemplary application for this invention is for large spacecraft radar antennas. For example, large antennas are under development which are made of lightweight materials which can be deployed, e.g. by inflation, to the approximate desired shape after the spacecraft has been deployed in orbit.

Because of the large size, such antennas may not provide sufficient precision to yield the desired beam quality. Nominal distortions of the structure will degrade the radar beam pattern. Although the desired beam quality can in principal be achieved by electronically compensating for the antenna distortion, the success of such compensation is dependent on the availability of a technique for rapidly and precisely determining the locations of the beam elements.

SUMMARY OF THE DISCLOSURE

Techniques for simultaneous measurement of multiple array elements of an array antenna are described. The array is illuminated with a coherent signal source, and each array element phase shifter is cycled through a range of phase shifter settings at a unique rate. The phase shifted signals from each array element are combined to provide a composite signal. The composite signal is processed to extract the phase of the coherent source signal as received at each element. The phase information is used to determine the location of the elements relative to each other.

BRIEF DESCRIPTION OF THE DRAWING

Features and advantages of the present invention will become more apparent from the following detailed description of an exemplary embodiment thereof, as illustrated in the accompanying drawings, in which:

FIG. 3, FIG. 3A and FIG. 3B schematically illustrate a further embodiment of a sensor system employing an embodiment of a calibration system.

DETAILED DESCRIPTION OF THE DISCLOSURE

An exemplary embodiment of the invention is employed in a radar system including an antenna array having a plurality of array elements, each having a phase shifter associated therewith to apply a delectable phase shift to signals received by or radiated from the element. The phase shifter may comprise a Transmit/Receive (T/R) module in an active array, or it may be part of a receive module in the case of a passive array system. Each phase shifter is Seattle to a desired phase shift value within a phase shift range. In a typical application, the phase shifters have a set of discrete values, e.g, a digital phase shifter having 3 bits, 8 bits or even higher resolution.

The array is augmented with at least one, and more typically three or even four suitably positioned reference radiators (beacons) that are capable of transmitting a coherent signal in the system RF band. If more than one beacon is employed, they are preferably located "orthogonally" in the sense that they illuminate the aperture from approximately orthogonal directions. Thus, each beacon provides a means to supply a reference signal for determining the displacement of an antenna element in one dimension. A single beacon provides one-dimensional information. Three beacons provide three-dimensional information.

The beacon(s) illuminate the aperture, either sequentially or simultaneously. During the illumination, each of the T/R modules (or some portion of the modules) receives the beacon signal(s). The phase of each of the RF signals is measured at each receive element. The progression of the measured phase along adjacent elements is then employed using conventional phase unwrapping techniques to derive the relative location of each element.

Figure 1:
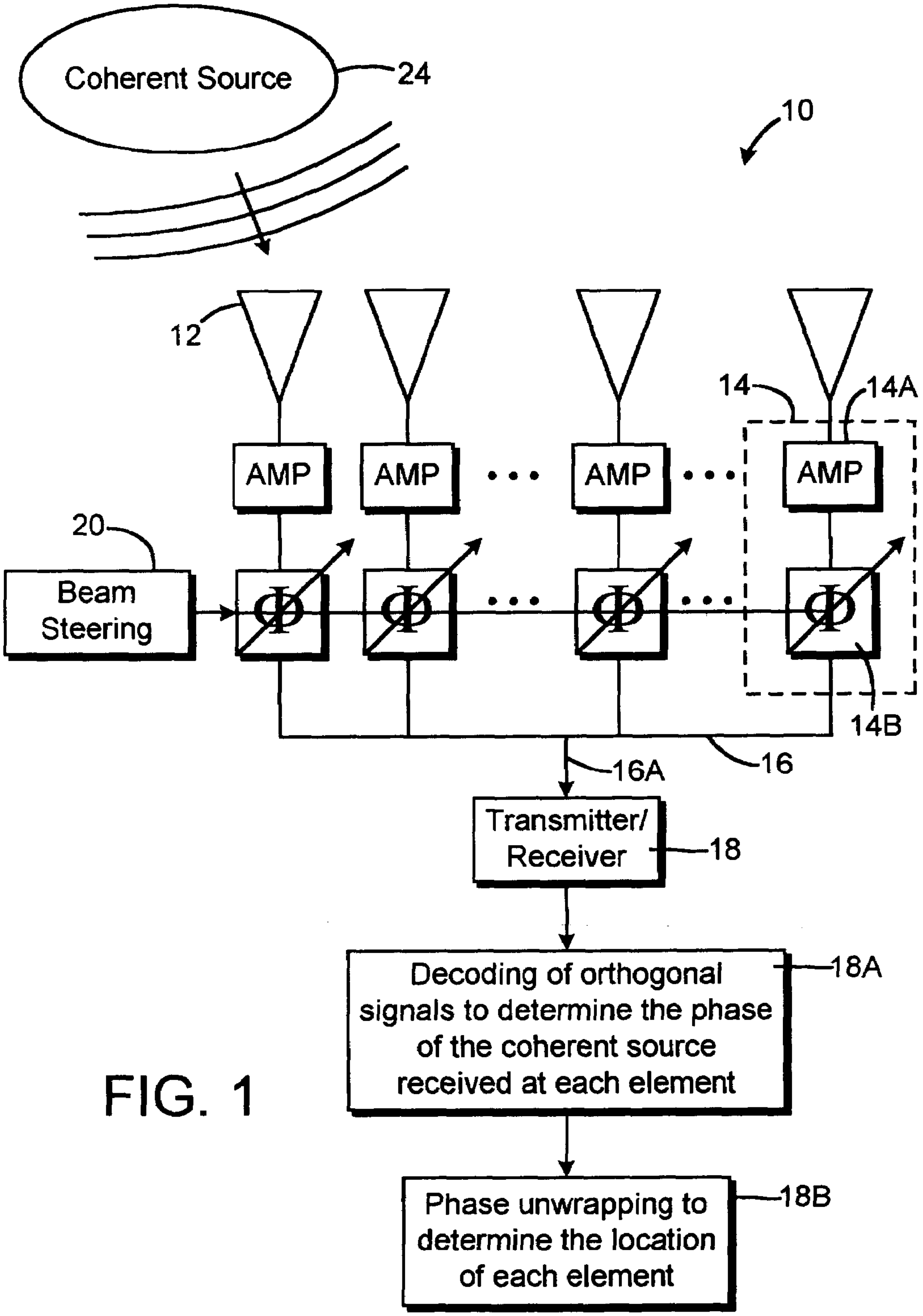
FIG. 1 is a simplified schematic diagram of an antenna array system with an exemplary functional block diagram of a calibration system.

FIG. 1 is a simplified schematic diagram of an antenna system 10 with an exemplary functional block diagram of a calibration system. The system includes an array of elements 12, each coupled to a port of a corresponding module 14 comprising an amplifier section 14A and a phase shifter 14B. Although FIG. 1 depicts an active array in which each element has an associated amplifier, the calibration techniques described herein apply as well to passive arrays in which the signals are combined without amplification. The phase shifters 14B are controlled by a beam steering computer 20 during normal array operation to steer the array beam to a desired direction, in a manner well known to those skilled in the art. A space or constrained feed network 16 connects each array element module 14 to a common port 16A. During receive, the composite signal is fed to a receiver 18. The receiver output signal is passed to processor 18A and 18B.

The coherent source(s) 24 is (are) located in the field of view of the antenna array. The coherent sources may be placed in the far field of the antenna, or in the near field (e.g., mounted on a boom extending from the antenna surface). Each source may radiate at a single frequency (CW), or may employ a coded waveform that can be decoded on receive, as discussed further below. During a calibration mode, the source or sources 24 generate(s) a signal within the frequency band of the antenna system, illuminating the array. During this mode, each array element phase shifter 14B is cycled through its range of phase shifts at a rate unique to each phase shifter. Each element is switched to generate a code which is orthogonal to that of all other elements, i.e. upon decoding with the appropriate processing, the signal from each element can be individually detected. The receiver decodes the composite signal to determine the phase of each beacon signal received by each element. The phase progression along adjacent elements is processed, e.g. using conventional phase unwrapping techniques, to determine the relative location of each element.

One beacon is adequate to determine the displacement of the array elements along one dimension. Additional beacons can be employed to establish the displacement along other dimensions and/or be employed to determine any unknown phase delay in each array element.

Figure 2:
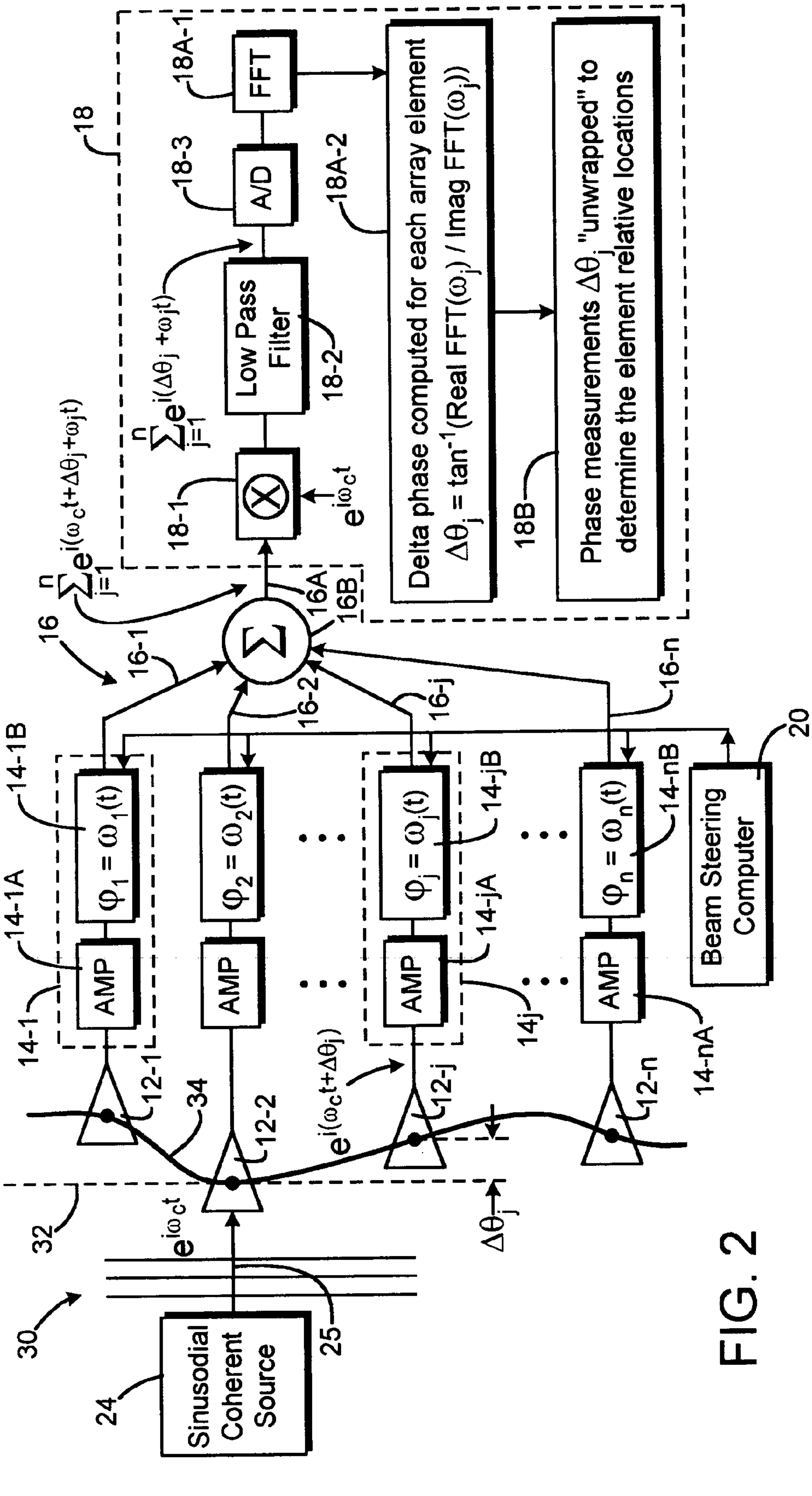
FIG. 2 is a schematic diagram of one exemplary embodiment of a calibration system for a antenna array system.

FIG. 2 is a schematic diagram of one exemplary embodiment of a calibration system for a radar antenna system 30. This illustrative example is an elementary case with the following exemplary attributes. There is an uncertainty of the array element positions in a single dimension, and a single stationary beacon illuminates a calibration signal along this dimension of uncertainty. In this example, the calibration signal is a sinusoidal beacon signal of the form $\exp(i\omega_c t)$. A corporate feed network is used to combine the signals from each array element. The array is characterized by equal phase delay propagating through each array element (except for the phase delay introduced by the phase shifters). Sinusoidal cycling of phase shifters provides the desired orthogonal coding. As will be explained later, these simplifications are not fundamental to practicing the calibration technique, and each can be removed without loss of capability.

The "n" radiator elements 12-1, 12-2 . . . 12-n of the array are nominally arranged on a line or plane 32 depending on the configuration of the system, i.e. a one dimensional or two dimensional system, but in an actual system, some or all of the elements are displaced from the line or plane 32, along a non-linear or non-planar line or surface 34. A coherent source 24 illuminates the array aperture with a sinusoidal coherent signal $\exp(i\omega_c t)$. The phase difference at each element due to the element displacement from the nominal position is $\Delta\theta_j$. The signal received at each element is $\exp[i(\omega_c t+\Delta\theta_j)]$. The signal received at each element is amplified by a respective amplifier 14-1A, 14-2A . . . 14-nA, and phase shifted by a respective phase shifter 14-1B, 14-2B . . . 14-nB. In this exemplary embodiment, the respective phase shifters each have $2^M$ phase states, and are controlled by the beam steering computer 20.

During a calibration mode, each element phase shifter is commanded to cycle through its $2^M$ phase states at a unique rate $\omega_j$ to distinguish each of the N radiating elements. Thus, the phase shift applied by each phase shifter j during the calibration mode is $_{j}=\omega_j t$. For example, assume that there are 1000 elements. Each phase shifter is instructed by the beam steering computer 20 to cycle through its progression of phase steps, one step at a time. The rate at which an individual phase shifter is cycled is unique to each phase shifter. The $j^{th}$ phase shifter is cycled at some rate, say j*10 Hz. That is, phase shifter 14-1B is cycled at 10 Hz, while phase shifter 14-1000B is cycled at 10,000 Hz.

The amplified, phase-shifted signal contributions from each element are combined by network 16 to provide a composite signal, $\Sigma \exp[i(\omega_c t+\Delta\theta_j+\omega_j t)]$ from j=1 to n. At the receiver 18, the composite signal is downconverted at mixer 18-1, and passed through a low pass filter to provide signal $\Sigma \exp[i(\Delta\theta_j+\omega_j t)]$ for j=1 to n. This signal is converted to digital form by analog-to-digital converter 18-3. The digitized signal is processed by a Fast Fourier Transform (FFT) 18A-1, and at process 18A-2, the differential phase is computed for each element as follows:

$$\Delta\theta_j=\tan^{-1}(\text{Real } FFT(\omega_j)/\text{Imag } FFT(\omega_j))$$

At process 18B, the phase measurements $\Delta\theta_j$ are "unwrapped" to determine the relative element locations at all the elements.

If the antenna array is moving relative to the beacon(s), as would be the case for a satellite antenna and a ground-based beacon, the Doppler shift of the carrier can be removed by appropriately adjusting the local oscillator frequency of the mixer 18-1.

One beacon, i.e. one coherent source, is adequate to determine the displacement of each element along one dimension, e.g. along direction 25 of FIG. 2. Additional beacons can be used to establish the displacement along other dimensions. These are preferably at orthogonal or generally orthogonal directions, and one would be positioned out of the plane of the array face, for three dimensional displacement location. For the case of a space-based antenna array, the beacon could be located on a boom extending from the antenna structure.

An additional beacon can also be used to determine (and compensate for) electrical path differences due to differences in the electrical properties of the components, and to monitor the status of the phase shifters. This can be accomplished as follows. Suppose that the total phase delay $\eta_j$ at the $j^{th}$ element is the sum of the delay $\Delta\theta_j$ due to the element displacement plus an unknown electrical delay $\Delta\epsilon_j$. Consider making measurements with two beacons 1 and 2 at different directions. From beacon 1, $\eta_{j1}=\Delta\theta_{j1}+\Delta\epsilon_j$. From beacon 2, $\eta_{j2}=\Delta\theta_{j2}+\Delta\epsilon_j$. Using knowledge of the directions of the two beacons, the relationship between $\Delta\theta_{j1}$ and $\Delta\theta_{j2}$ can be determined. Then, the measured values of $\eta_{j1}$ and $\eta_{j2}$ and the equations for these two values can be used to determine for each element j the values for $\Delta\theta_{j1}$, $\Delta\theta_{j2}$ and $A\Delta\epsilon_j$.

Figure 3A:
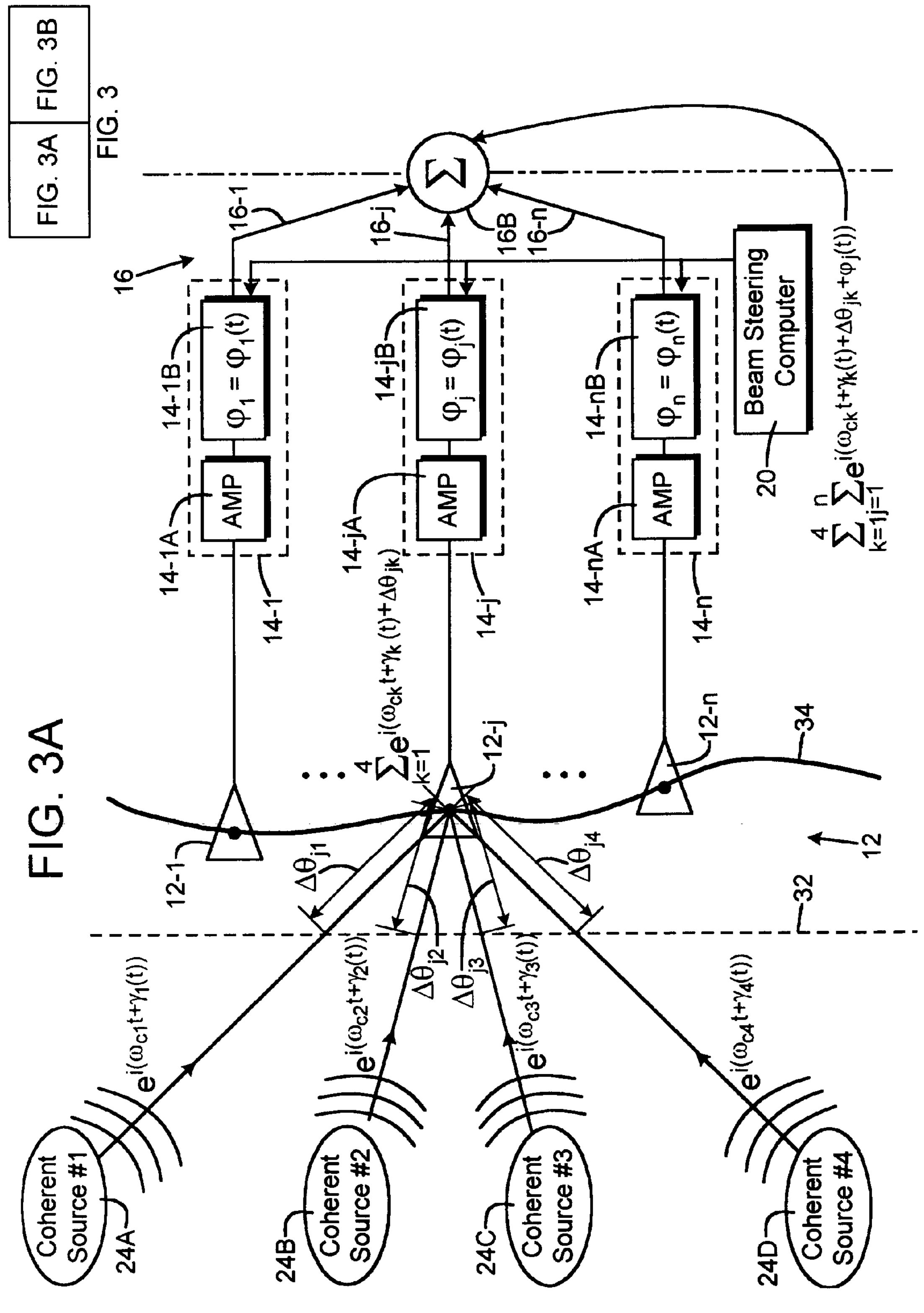
Figure 3B:
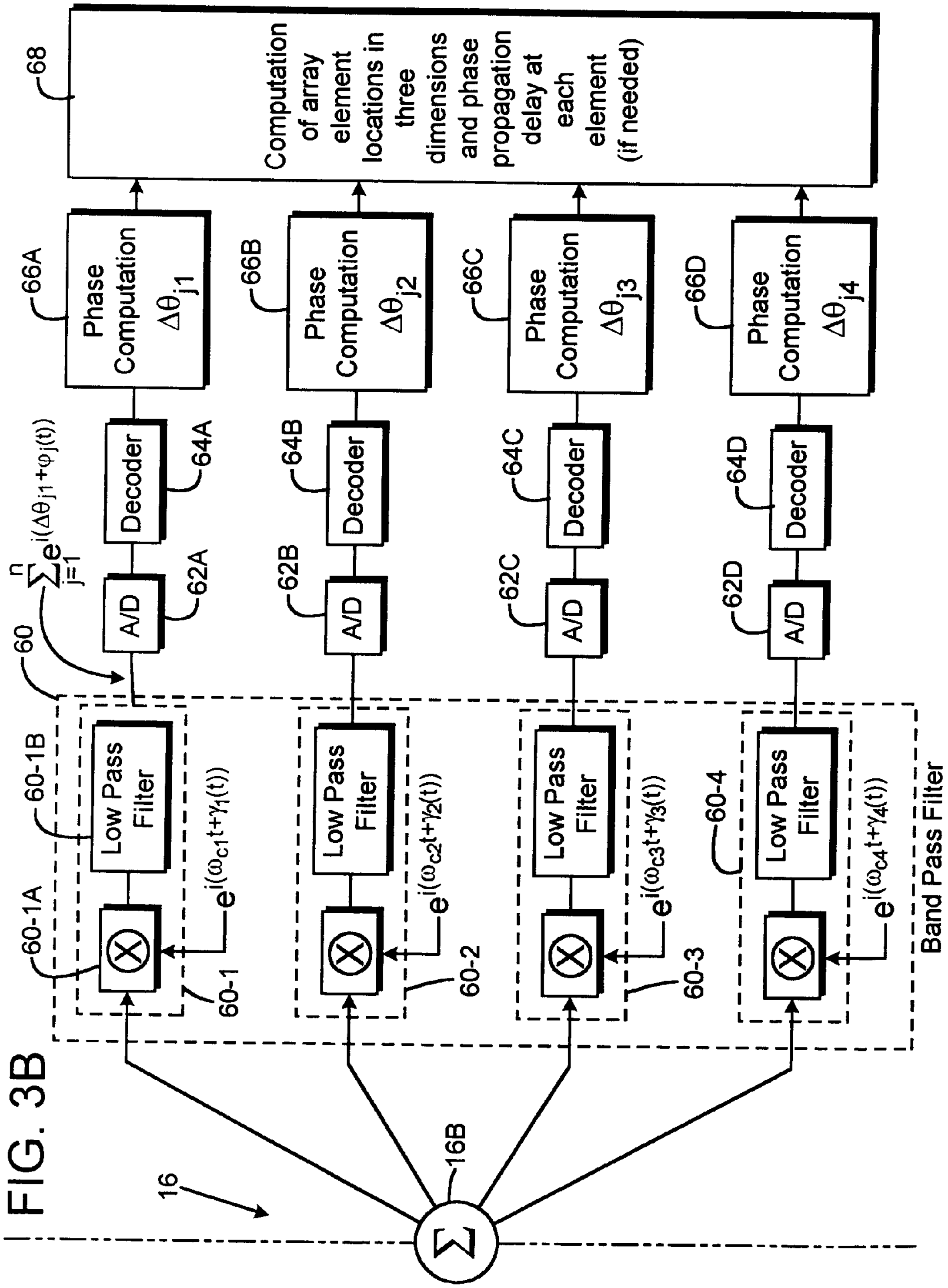

FIGS. 3, 3A and 3B show an embodiment of a sensor system utilizing a calibration system in which four beacons 24A, 24B, 24C, 24D located at four directions from the array 12 of elements 12-1, 12-2 . . . 12-n are employed. For this example, the location of each element may be uncertain in any one or all three dimensions. Each beacon generates a coherent source signal of any type which is orthogonal to the other beacons in the sense that through appropriate processing the signal from each of the beacons can be individually detected. The array feed 16 which in this receive example is represented as 16-1, . . . 16-j . . . , 16-n, and associated combiner 16B can be open or constrained. Each array element T/R (or receive only) module 14-1, . . . 14-j, . . . 14-n may have a phase delay of unknown amount which results from variations in the electrical properties of the module. The phase shifter 14-1B, . . . 14-jB, . . . 14-nB of each element is cycled in any manner which generates a signal which is orthogonal to those of other elements. The beacon sources 24A, 24B, 24C, 24D may be stationary or moving. The motion is compensated by providing the appropriate Doppler offset during processing.

As in the embodiment of FIG. 2, the array elements ideally are located on a line or plane 32, but in a fielded array, there is some deviation from the ideal, so that the elements are displaced from 32 on a line or surface 34. As a result, each element will be characterized by some differential phase shift from the ideal array location, for each source. As illustrated in FIG. 3A, element 12-j has phase shifts $\Delta\theta_{j1}$, $\Delta\theta_{j2}$, $\Delta\theta_{j3}$, $\Delta\theta_{j4}$, respectively from each of the four beacons.

The beacons 24A, 24B, 24C, 24D generate coherent signals. Source #1 (24A) generates a signal $\exp[i(\omega_{c1}t+\gamma_1(t))]$, source #2 (24A) generates a signal $\exp[i(\omega_{c2}t+\gamma_2(t))]$, source #3 generates a signal $\exp[i(\omega_{c3}t+\gamma_3(t))]$, and source #4 (24D) generates a signal $\exp[i(\omega_{c4}t+\gamma_4(t))]$, where $\omega_{ck}$ represents the carrier frequency for the $k^{th}$ source and $\gamma_k(t)$ represents any additional modulation of the beacon signal k. Assuming the beacon sources are radiating simultaneously, each element will receive a composite of the four signals. For example, element 12-j will provide a composite signal $\Sigma \exp[i(\omega_{ck}t+\gamma_k(t)+\Delta\theta_{jk})]$, over k=1 to 4.

The element composite signals are respectively amplified and phase shifted by the corresponding module 14-j. For example, module 14-j applies a phase shift $\phi_j=\phi_j(t)$. Thus, the phase shift during the calibration mode is time varying, at a different rate for each element phase shifter. The signals from each module are combined to form a composite signal, $\Sigma\Sigma \exp[i(\omega_{ck}t+\gamma_k(t)+\Delta\theta_{jk}+\phi_j(t))]$, over k=1 to 4 and j=1 to n. This signal is then processed (FIG. 3B) by four channels, one for each beacon, to recover phase information for each element and for each beacon signal.

In this exemplary embodiment, four down converters, low pass filters, and A/Ds are employed to process the coded signals from each of the four beacons. However, the techniques described here apply as well to other down conversion approaches. For example, the composite signal could also be down converted to an intermediate band which is sampled by a single A/D. The compensation for the beacon motion and the decoding necessary to extract the desired signal from each beacon would be performed digitally.

Each channel includes a filter comprising a mixer and low pass filter. Each mixer mixes the composite signal with a corresponding mixer signal $\exp[i(\omega_{ck}t+\gamma_k(t))]$, plus any compensation needed to account for motion of the beacons relative to the antenna. The resulting signal is filtered by a low pass filter comprising the filter bank 60. Thus, a first component of the composite signal is passed to a first channel for the first source 24A comprising mixer 60-1A, low pass filter 60-1B, A/D converter 62A, decoder 64A and phase computation function 66A. The signal at the output of the low pass filter is $\Sigma \exp[i(\Delta\theta_{j1}+\phi_j(t))]$, over j=1 to n.

Another component of the composite signal is passed to a second channel for the second source 24B comprising mixer 60-2A, low pass filter 60-2B, A/D converter 62B, decoder 64B and phase computation function 66B. A third component of the composite signal is passed to a third channel for the third source 24C comprising mixer 60-3A, low pass filter 60-3B, A/D converter 62C, decoder 64C and phase computation function 66C. A fourth component of the composite signal is passed to a fourth channel for the fourth source 24D comprising mixer 60-4A, low pass filter 60-4B, A/D converter 62D, decoder 64D and phase computation function 66D. Each of the decoders 64A–64D applies the processing necessary to extract the signal associated with the $j^{th}$ element. If the element phase shifter is switched sinusoidally, the decoding is performed with an FFT as previously described. If coding schemes other than the FFT are employed, the suitable inverse transfer function is applied to extract the desired signal.

Once the phases have been computed for each beacon, a processor 68 computes the array element locations in three dimensions and in addition, if necessary, determines any phase propagation delay associated with each of the array elements (as described above).

While the system has been illustrated with reference to a receive antenna, the calibration technique applies analogously to a transmit antenna. In this case, the beacon is replaced by a receiver and the associated FFT processing capability. The transmitter of the radar system transmits a coherent signal and the phase shifters are cycled at respective unique rates as in the receive case. Further, while the system has been illustrated with sine wave functions and an FFT for processing, other orthogonal functions and associated transforms could alternatively be used.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for measurement of multiple array elements of an array antenna, each array element having a variable phase shifter associated therewith, the method comprising:

illuminating the array with a coherent source signal;

cycling each array element phase shifter through a range of phase shifter settings at a unique rate to generate phase shifted signals;

combining the phase shifted signals from each array element to provide a composite signal;

processing the composite signal to extract a phase of the coherent source signal as received at each element; and using the extracted phase for each element to determine a relative location of each said element.

2. The method of claim 1, wherein said processing the composite signal comprises applying a Fast Fourier transform (FFT) to the composite signal, and extracting said phase of each element from the FFT.

3. The method of claim 1, wherein the array antenna has an operating frequency band, and wherein the coherent source illuminates the array with a constant wave signal.

4. The method of claim 1, wherein there is relative motion between the coherent signal source and the array, and said processing the composite signal further comprises:

processing the composite signal to compensate for said relative motion.

5. The method of claim 4, wherein said processing the composite signal to compensate for said relative motion comprises applying an appropriate Doppler offset compensation.

6. A method for measurement of multiple array elements of an array antenna, each array having a variable phase shifter associated therewith, the method comprising:

illuminating the array with three coherent source signals respectively located at three different directions from the array antenna;

cycling each array element phase shifter through a range of phase shifter settings at a unique rate to generate phase shifted signals;

combining the phase shifted signals from each array element to provide a composite signal;

processing the composite signal to extract respective phases of the three coherent source signals as received at each element; and using the extracted plurality of phases for each element to determine a location of each said element relative to the other elements in three dimensions.

7. The method of claim 6, wherein said processing the composite signal comprises applying a Fast Fourier transform (FFT) to the composite signal, and extracting said phase of each element from the FFT.

8. The method of claim 6, wherein the array antenna has an operating frequency band, and wherein the coherent sources illuminates the array with constant wave signals.

9. The method of claim 6, wherein said illuminating the array with three coherent source signals comprises simultaneously illuminating said array with said three coherent source signals.

10. The method of claim 9, wherein said processing the composite signal comprises splitting the composite signal into three components and passing one of said components through a processing channel tuned to a respective one of said three coherent source signals.

11. The method of claim 6, wherein said illuminating the array with three coherent source signals comprises sequentially illuminating the array with respective ones of the three coherent source signals.

12. The method of claim 6, wherein there is relative motion between the three coherent signal sources and the array, and said processing the composite signal further comprises:

processing the composite signal to compensate for said relative motion.

13. The method of claim 12, wherein said processing the composite signal to compensate for said relative motion comprises applying an appropriate Doppler offset compensation.

14. A method for measurement of multiple array elements of an array antenna, each array having a module including a variable phase shifter associated therewith, the method comprising:

illuminating the array with first and second coherent source signals from first and second directions;

cycling each array element phase shifter through a range of phase shifter settings at a unique rate to generate phase shifted signals;

combining the phase shifted signals from each array element to provide a composite signal;

processing the composite signal to extract a phase of the first and second coherent source signals as received at each element; and using the extracted phase for each element to determine a relative location of each said element relative to said first direction and relative phase delays through each said module.

15. The method of claim 14, wherein said processing the composite signal comprises applying a Fast Fourier transform (FFT) to the composite signal, and extracting said phase of each element from the FFT.

16. The method of claim 14, wherein the array antenna has an operating frequency band, and wherein the coherent source signals illuminate the array with a constant wave signal.

17. The method of claim 14, wherein there is relative motion between the coherent signal sources and the array, and said processing the composite signal further comprises:

processing the composite signal to compensate for said relative motion.

18. The method of claim 17, wherein said processing the composite signal to compensate for said relative motion comprises applying an appropriate Doppler offset compensation.

19. A method for measurement of multiple array elements of an array antenna, each array having a module including a variable phase shifter associated therewith, the method comprising:

illuminating the array with a number (n+1) of coherent source signals from n+1 directions;

cycling each array element phase shifter through a range of phase shifter settings at a unique rate to generate phase shifted signals;

combining the phase shifted signals from each array element to provide a composite signal;

processing the composite signal to extract a phase of the n+1 coherent source signals as received at each element; and using the extracted phase for each element to determine a relative location of each said element relative to n directions and relative phase delays through each said module.

20. A method for measurement of multiple array elements of an array antenna, each array having a variable phase shifter associated therewith, the method comprising:

(i) illuminating the array with a first coherent signal source from a first direction;

(ii) cycling each array element phase shifter through a range of phase shifter setting at a unique rate to generate phase shifted signals;

(iii)combining the phase shifted signals from each array element to provide a composite signal;

(iv) processing the composite signal to extract a phase history of each element for said first source;

(v) illuminating the array with a second coherent source from a second direction generally orthogonal to said first direction;

(vi) repeating steps (ii) and (iii) to provide a composite signal for the second source;

(vii) processing the composite signal for the second source to extract a phase history of each element for said second source;

(viii) illuminating the array with a third coherent source from a third direction generally orthogonal to said first direction and said second direction;

(ix) repeating steps (ii) and (iii) to provide a composite signal for the third source;

(x) processing the composite signal for the third source to extract a phase history of each element for said third source; and the array with a second coherent source from a second direction generally orthogonal to said first direction;

(xi) repeating steps (ii) and (iii) to provide a composite signal for the second source;

(xii) processing the composite signal for the second source to extract a phase history of each element for said second source; and (xiii) processing the phase histories for said first source, said second source and said third source to determine the location of each array element.

21. The method of claim 20, wherein said processing the composite signal comprises applying a Fast Fourier transform (FFT) to the composite signal, and extracting the phase history of each element from the FFT.

22. The method of claim 20, wherein the array antenna has an operating frequency band, and wherein the first source, said second source and said third source illuminates the array with respective constant wave signals.

* * * * *